US009145131B2

(12) United States Patent
Watanabe

(10) Patent No.: US 9,145,131 B2
(45) Date of Patent: Sep. 29, 2015

(54) VEHICLE AND VEHICLE CONTROL METHOD

(75) Inventor: Kenta Watanabe, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/232,787

(22) PCT Filed: Aug. 4, 2011

(86) PCT No.: PCT/JP2011/067840
§ 371 (c)(1),
(2), (4) Date: Jan. 14, 2014

(87) PCT Pub. No.: WO2013/018221
PCT Pub. Date: Feb. 7, 2013

(65) Prior Publication Data
US 2014/0163800 A1 Jun. 12, 2014

(51) Int. Cl.
*B60W 10/06* (2006.01)
*B60L 11/18* (2006.01)
*B60W 20/00* (2006.01)
*B60K 6/445* (2007.10)
(Continued)

(52) U.S. Cl.
CPC ............ *B60W 20/106* (2013.01); *B60K 6/445* (2013.01); *B60L 11/1851* (2013.01); *B60L 11/1859* (2013.01); *B60L 11/1861* (2013.01); *B60W 10/06* (2013.01); *B60W 10/08* (2013.01); *B60W 20/00* (2013.01); *F02N 11/0862* (2013.01); *B60W 2710/244* (2013.01); *Y02T 10/6239* (2013.01); *Y02T 10/6286* (2013.01); *Y02T 10/705* (2013.01); *Y02T 10/7005* (2013.01); *Y02T 10/7044* (2013.01); *Y10S 903/93* (2013.01)

(58) Field of Classification Search
CPC ........ H02J 7/00; B60L 11/18; B60L 11/1851; B60L 11/1861; B60W 10/06; B60W 20/00; B60W 20/106
USPC ......... 701/22; 320/104, 106, 134; 180/65.265
See application file for complete search history.

(56) References Cited

U.S. PATENT DOCUMENTS

| 6,653,745 B1 * | 11/2003 | Masaki et al. ............... 307/10.1 |
| 7,583,053 B2 * | 9/2009 | Kamohara .................... 320/106 |
| 2007/0138998 A1 | 6/2007 | Togashi et al. |

(Continued)

FOREIGN PATENT DOCUMENTS

| JP | 2000-134719 A | 5/2000 |
| JP | 2002-017001 A | 1/2002 |

(Continued)

*Primary Examiner* — Tan Q Nguyen
(74) *Attorney, Agent, or Firm* — Sughrue Mion, PLLC

(57) ABSTRACT

A vehicle includes an internal combustion engine, a first rotating electric machine starting the internal combustion engine, a power control unit for operating the first rotating electric machine, a power storage device for supplying electric power to the power control unit, and a control device controlling the power control unit such that a voltage of the power storage device does not fall below a lower limit. When a change condition including a condition that the internal combustion engine is being operated is met, the control device sets the lower limit at a value lower than while the internal combustion engine is at a stop. Preferably, the change condition further includes a condition that a magnitude of voltage change of the power storage device is less than or equal to a first threshold value in addition to the condition that the internal combustion engine is being operated.

9 Claims, 8 Drawing Sheets

(51) Int. Cl.
*B60W 10/08* (2006.01)
*F02N 11/08* (2006.01)

(56) References Cited

U.S. PATENT DOCUMENTS

| | | | |
|---|---|---|---|
| 2010/0224157 A1* | 9/2010 | Mizuno | 123/179.4 |
| 2012/0010771 A1* | 1/2012 | Kato et al. | 701/22 |
| 2013/0030633 A1* | 1/2013 | Yamamoto et al. | 701/22 |
| 2013/0041543 A1* | 2/2013 | Takayanagi et al. | 701/22 |

FOREIGN PATENT DOCUMENTS

| | | |
|---|---|---|
| JP | 2002-051405 A | 2/2002 |
| JP | 2006-211789 A | 8/2006 |
| JP | 2007-162657 A | 6/2007 |
| JP | 2008-254603 A | 10/2008 |
| JP | 2010-183785 A | 8/2010 |
| JP | 2010-268578 A | 11/2010 |

* cited by examiner

VEHICLE AND VEHICLE CONTROL METHOD

CROSS REFERENCE TO RELATED APPLICATIONS

This is a National Stage of International Application No. PCT/JP2011/067840 filed Aug. 4, 2011, the contents of which is incorporated herein by reference in its entirety.

TECHNICAL FIELD

The present invention relates to a vehicle and a vehicle control method, and more particularly to a vehicle including an internal combustion engine and a rotating electric machine and a vehicle control method.

BACKGROUND ART

A hybrid vehicle using an engine and a motor in combination as drive sources has mounted thereon a large-capacity power storage device. Such a power storage device is managed such that overdischarge or overcharge does not occur.

Japanese Patent Laying-Open No. 2002-017001 (PTD 1) discloses a technique for effectively utilizing a power storage device of relatively small capacity. This document discloses a hybrid electric vehicle in which a power storage device whose charging/discharging is controlled by a control circuit is used, wherein selection can be made among three running modes of a fixed-speed running mode, an accelerated running mode and a decelerated running mode, and a charging management range between a charging upper limit and a charging lower limit for the power storage device is changed in accordance with each running mode.

CITATION LIST

Patent Document

PTD 1: Japanese Patent Laying-Open No. 2002-017001
PTD 2: Japanese Patent Laying-Open No. 2007-162657
PTD 3: Japanese Patent Laying-Open No. 2000-134719
PTD 4: Japanese Patent Laying-Open No. 2010-183785
PTD 5: Japanese Patent Laying-Open No. 2002-051405

SUMMARY OF INVENTION

Technical Problem

Parameters for managing a battery include a voltage across terminals of the battery (hereinafter also referred to as a battery voltage) besides the state of charge (also referred to as SOC, an amount of power storage, and a remaining capacity). When the voltage across terminals of the battery falls below a predetermined value, an adverse effect is exerted on the battery life.

Therefore, the voltage across terminals of the battery is also an important parameter for battery management. This voltage across terminals of the battery may be changed abruptly depending on the battery performance, vehicle running conditions and the like. Even in such a case, it is necessary to take some measure such that the voltage across terminals of the battery does not fall below a predetermined value, however, the above-mentioned Japanese Patent Laying-Open No. 2002-017001 makes no mention of such consideration.

In terms of battery protection, it is conceivable to set a management lower limit having a margin sufficiently allowing for the predetermined value under which an adverse effect is exerted on the battery life. With an excessively wide margin, however, the battery capacity cannot be fully utilized.

The present invention has an object to provide a vehicle and a vehicle control method that simultaneously achieve protection of a power storage device and effective use of capacity.

Solution to Problem

In summary, according to the present invention, a vehicle includes an internal combustion engine, a first rotating electric machine starting the internal combustion engine, a power control unit for operating the first rotating electric machine, a power storage device for supplying electric power to the power control unit, and a control device controlling the power control unit such that a voltage of the power storage device does not fall below a lower limit. When a change condition including a condition that the internal combustion engine is being operated is met, the control device sets the lower limit at a value lower than while the internal combustion engine is at a stop.

Preferably, the change condition further includes a condition that a magnitude of voltage change of the power storage device is less than or equal to a first threshold value in addition to the condition that the internal combustion engine is being operated.

More preferably, the change condition further includes a condition that the voltage of the power storage device is higher than a second threshold value in addition to the conditions that the internal combustion engine is being operated and the magnitude of voltage change of the power storage device is less than or equal to the first threshold value.

Preferably, the vehicle further includes a second rotating electric machine operated by the power control unit and generating promotion torque of the vehicle.

More preferably, when the internal combustion engine is being operated, the first rotating electric machine receives motive power from the internal combustion engine to generate electric power according to necessity.

Further preferably, the vehicle further includes a power split device connected to each of rotation shafts of the first rotating electric machine, the second rotating electric machine and the internal combustion engine.

Preferably, the first rotating electric machine generates promotion torque of the vehicle, and according to necessity, generates torque for starting the internal combustion engine.

More preferably, the vehicle further includes a clutch provided between a rotation shaft of the internal combustion engine and a rotation shaft of the first rotating electric machine, and a speed change mechanism provided between the first rotating electric machine and a drive shaft.

According to another aspect of the present invention, a method for controlling a vehicle including an internal combustion engine, a first rotating electric machine starting the internal combustion engine, a power control unit for operating the first rotating electric machine, and a power storage device for supplying electric power to the power control unit includes the steps of setting a lower limit at an initial value, when a change condition including a condition that the internal combustion engine is being operated is met, setting the lower limit at a value lower than while the internal combustion engine is at a stop, and controlling the power control unit such that a voltage of the power storage device does not fall below the lower limit.

Advantageous Effects of Invention

According to the present invention, a vehicle and a vehicle control method that simultaneously achieve protection of a power storage device and effective use of capacity are achieved.

DESCRIPTION OF EMBODIMENTS

Figure 1:
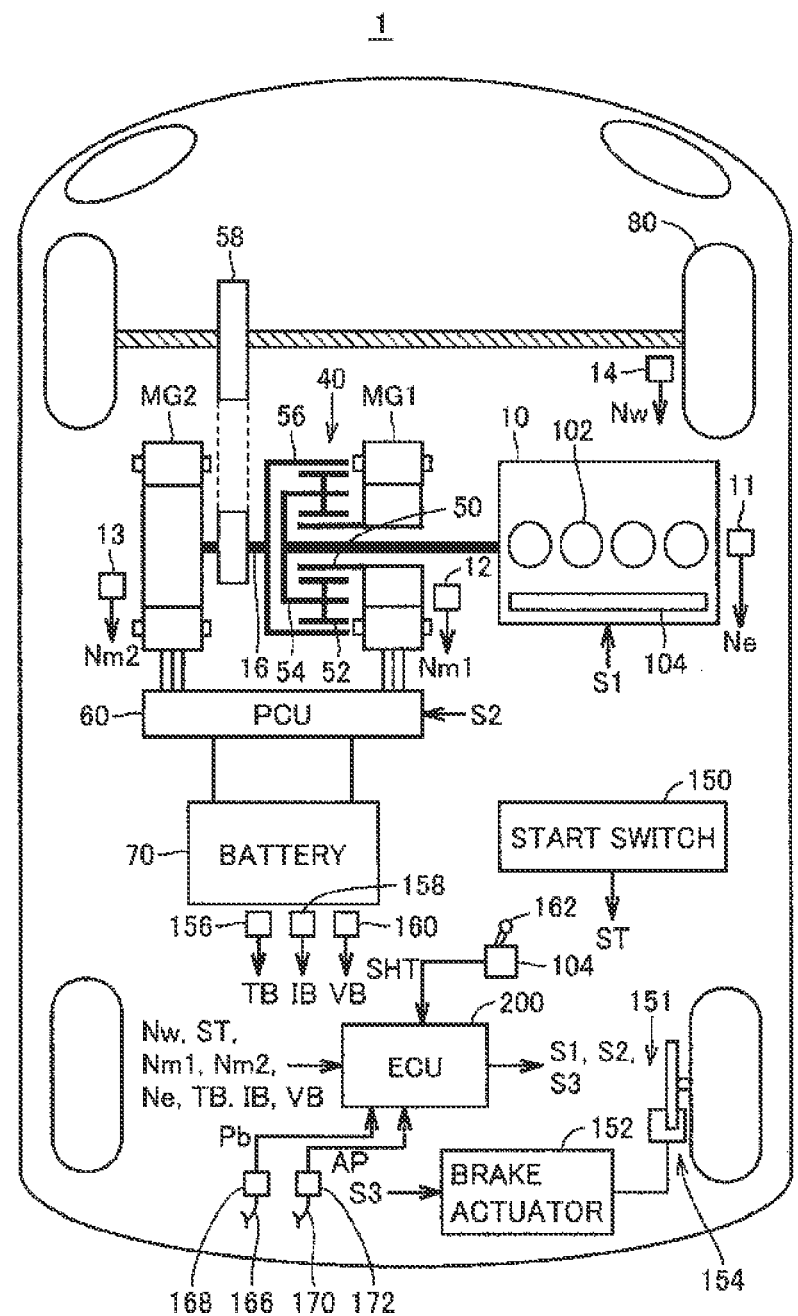
FIG. 1 is an overall block diagram of a vehicle 1 according to an embodiment.

An embodiment of the present invention will be described hereinafter with reference to the drawings. In the description below, the same or corresponding elements have the same reference characters allotted. Detailed description thereof will not be repeated.

Embodiment

FIG. 1 is an overall block diagram of vehicle 1 according to an embodiment. Referring to FIG. 1, vehicle 1 includes an engine 10, a drive shaft 16, a motor generator MG1, a motor generator MG2, a power split device 40, a reduction gear 58, a PCU (Power Control Unit) 60, a battery 70, a drive wheel 80, a start switch 150, a braking device 151, and an ECU (Electronic Control Unit) 200.

This vehicle 1 runs with driving force output from at least one of engine 10 and motor generator MG2. Motive power generated by engine 10 is split into two paths by power split device 40. One path of the two paths is a path for transmission to drive wheel 80 through reduction gear 58, and the other path is a path for transmission to motor generator MG1.

Motor generators MG1 and MG2 are each implemented, for example, by a three-phase AC rotating electric machine. Motor generators MG1 and MG2 are driven by PCU 60.

Motor generator MG1 has a function as a generator for generating electric power with motive power of engine 10 split by power split device 40 and for charging battery 70 with electric power through PCU 60. In addition, motor generator MG1 rotates a crankshaft which is an output shaft of engine 10, upon receiving electric power from battery 70. Thus, motor generator MG1 has a function as a starter for starting engine 10.

Motor generator MG2 has a function as a drive motor for providing driving force to drive wheel 80 by using at least any one of electric power stored in battery 70 and electric power generated by motor generator MG1. In addition, motor generator MG2 has a function as a generator for charging battery 70 through PCU 60 with electric power generated through regenerative braking.

Engine 10 is, for example, such an internal combustion engine as a gasoline engine or a diesel engine. Engine 10 includes a plurality of cylinders 102 and a fuel injector 104 for supplying fuel to each of the plurality of cylinders 102. Fuel injector 104 injects an appropriate amount of fuel at appropriate timing to each cylinder or stops injection of fuel to each cylinder based on a control signal S1 from ECU 200.

Engine 10 is further provided with an engine rotation speed sensor 11 for detecting a rotation speed Ne of a crankshaft of engine 10 (hereinafter denoted as an engine rotation speed). Engine rotation speed sensor 11 transmits a signal indicating detected engine rotation speed Ne to ECU 200.

Power split device 40 mechanically couples three elements of drive shaft 16 for rotating drive wheel 80, the output shaft of engine 10, and a rotation shaft of motor generator MG1 to one another. Power split device 40 allows, by setting any one of the three elements described above as a reaction force element, transmission of motive power between two other elements. The rotation shaft of motor generator MG2 is coupled to a drive shaft 16.

Power split device 40 is a planetary gear mechanism including a sun gear 50, a pinion gear 52, a carrier 54, and a ring gear 56. Pinion gear 52 engages with each of sun gear 50 and ring gear 56. Carrier 54 rotatably supports pinion gear 52 and it is coupled to the crankshaft of engine 10. Sun gear 50 is coupled to the rotation shaft of motor generator MG1. Ring gear 56 is coupled to the rotation shaft of motor generator MG2 and reduction gear 58 with drive shaft 16 being interposed.

Reduction gear 58 transmits motive power from power split device 40 or motor generator MG2 to drive wheel 80. In addition, reduction gear 58 transmits reaction force from a road surface received by drive wheel 80 to power split device 40 or motor generator MG2.

Battery 70 is a power storage device and it is a rechargeable DC power supply. For example, such a secondary battery as a nickel metal hydride battery or a lithium ion battery is employed as battery 70. A voltage of battery 70 is, for example, approximately 200 V. As described above, battery 70 is charged with electric power generated by motor generator MG1 and/or motor generator MG2 and it may be charged with electric power supplied from an external power supply (not shown). It is noted that battery 70 is not limited to a secondary battery and it may be a component capable of generating a DC voltage, such as a capacitor.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. Start switch 150 may be such a switch that a key is inserted in a key cylinder and turned to a prescribed position. Start switch 150 is connected to ECU 200. In response to a driver's operation of start switch 150, start switch 150 transmits a signal ST to ECU 200.

For example, when ECU 200 receives signal ST while a system of vehicle 1 is in a stop state, ECU 200 determines that it has received an activation instruction and causes the system of vehicle 1 to make transition from the stop state to an active state. Alternatively, when ECU 200 receives signal ST while the system of vehicle 1 is in the active state, ECU 200 determines that it has received a stop instruction and causes the system of vehicle 1 to make transition from the active state to the stop state. In the description below, a driver's operation of start switch 150 while the system of vehicle 1 is in the active state is referred to as an IG OFF operation, and a driver's operation of start switch 150 while the system of vehicle 1 is in the stop state is referred to as an IG ON operation. When the system of vehicle 1 makes transition to the active state, electric power is supplied to a plurality of pieces of equipment necessary for vehicle 1 to run or the like and an operable state is brought about. On the other hand, when the system of vehicle 1 makes transition to the stop state, supply of electric power to some of the plurality of pieces of equipment necessary for vehicle 1 to run is stopped or the like and an operation stop state is brought about.

A resolver 12 is a rotation speed sensor provided in motor generator MG1. Resolver 12 detects a rotation speed Nm1 of motor generator MG1. Resolver 12 transmits a signal indicating detected rotation speed Nm1 to ECU 200.

A resolver 13 is a rotation speed sensor provided in motor generator MG2. Resolver 13 detects a rotation speed Nm2 of motor generator MG2. Resolver 13 transmits a signal indicating detected rotation speed Nm2 to ECU 200.

A wheel speed sensor 14 detects a rotation speed Nw of drive wheel 80. Wheel speed sensor 14 transmits a signal indicating detected rotation speed Nw to ECU 200. ECU 200 calculates a velocity V of vehicle 1 based on received rotation speed Nw. It is noted that ECU 200 may calculate velocity V of vehicle 1 based on rotation speed Nm2 of motor generator MG2 instead of rotation speed Nw.

A brake pedal 166 is provided in a driver's seat. Brake pedal 166 is provided with a brake pedal pressing force sensor 168. Brake pedal pressing force sensor 168 detects a driver's pressing force Pb of brake pedal 166. Brake pedal pressing force sensor 168 transmits a signal indicating detected pressing force Pb to ECU 200. Brake pedal pressing force sensor 168 may detect, for example, a hydraulic pressure in a master cylinder coupled to brake pedal 166 as pressing force Pb. Alternatively, a stroke sensor for detecting an amount of pressing-down of brake pedal 166 may be employed instead of brake pedal pressing force sensor 168.

An accelerator pedal 170 is provided in the driver's seat. Accelerator pedal 170 is provided with a pedal stroke sensor 172. Pedal stroke sensor 172 detects an amount of stroke AP of accelerator pedal 170. Pedal stroke sensor 172 transmits a signal indicating amount of stroke AP to ECU 200. An accelerator press-down degree (%) is calculated based on amount of stroke AP of accelerator pedal 170. It is noted that an accelerator pedal pressing force sensor for detecting a driver's pressing force of accelerator pedal 170 may be employed instead of pedal stroke sensor 172.

Braking device 151 includes a brake actuator 152 and a disk brake 154. Disk brake 154 includes a brake disk that rotates integrally with a wheel and a brake caliper for restricting rotation of the brake disk by using a hydraulic pressure. The brake caliper includes brake pads provided to sandwich the brake disk in a direction in parallel to the rotation shaft and a wheel cylinder for transmitting a hydraulic pressure to the brake pad. Brake actuator 152 regulates a hydraulic pressure supplied to the wheel cylinder by regulating a hydraulic pressure generated by the driver's pressing-down of the brake pedal and a hydraulic pressure generated by using a pump, an electromagnetic valve, and the like, based on a control signal S3 received from ECU 200. Though FIG. 1 shows disk brake 154 only for a right rear wheel, disk brake 154 is provided for each wheel. Alternatively, a drum brake may be employed instead of disk brake 154.

ECU 200 generates control signal S1 for controlling engine 10 and outputs generated control signal S1 to engine 10. In addition, ECU 200 generates control signal S2 for controlling PCU 60 and outputs generated control signal S2 to PCU 60. Furthermore, ECU 200 generates control signal S3 for controlling brake actuator 152 and outputs generated control signal S3 to brake actuator 152.

By controlling engine 10, PCU 60, and the like, ECU 200 controls the entire hybrid system, that is, a state of charge and discharge of battery 70, and an operation state of engine 10, motor generator MG1, and motor generator MG2, such that vehicle 1 can most efficiently operate.

ECU 200 calculates requested driving force corresponding to an amount of pressing-down of the accelerator pedal (not shown) provided in the driver's seat. ECU 200 controls torque of motor generator MG1, and motor generator MG2 and output of engine 10 in accordance with the calculated requested driving force.

In vehicle 1 having the construction as described above, when efficiency of engine 10 is bad at the time of start, during running at a low speed, or the like, running only with motor generator MG2 is carried out.

Alternatively, during normal running, for example, power split device 40 splits motive power of engine 10 into two paths for motive power. Drive wheel 80 is directly driven by one motive power. Electric power is generated by driving motor generator MG1 with the other motive power. Here, ECU 200 causes motor generator MG2 to drive with the use of generated electric power. By thus driving motor generator MG2, drive of drive wheel 80 is assisted.

During deceleration of vehicle 1, motor generator MG2 following rotation of drive wheel 80 functions as a generator so that regenerative braking is carried out. Electric power recovered in regenerative braking is stored in battery 70. It is noted that ECU 200 increases an amount of electric power generated by motor generator MG1 by increasing output of engine 10 in the case where a state of charge of the power storage device (in the description below, denoted as SOC (State of Charge)) has lowered and charging is particularly required. SOC of battery 70 is thus raised. In addition, ECU 200 may carry out control for increasing driving force from engine 10 as necessary, even during running at a low speed. For example, a case where charging of battery 70 is required as described above, a case where auxiliary machinery such as an air-conditioner is driven, a case where a temperature of a coolant for engine 10 is raised to a prescribed temperature, and the like are exemplified.

In controlling an amount of charging of battery 70 and an amount of discharge therefrom, ECU 200 sets input electric power allowed during charging of battery 70 (in the description below, denoted as "charge power upper limit Win") and output electric power allowed during discharging from battery 70 (in the description below, denoted as "discharge power upper limit Wout") based on battery temperature TB and current SOC. For example, as the current SOC lowers, discharge power upper limit Wout is set to gradually lower. On the other hand, as the current SOC is higher, charge power upper limit Win is set to gradually lower.

A secondary battery employed as battery 70 has such temperature dependence that internal resistance increases when the temperature is low. When the temperature is high, excessive increase in temperature due to further heat generation should be prevented. Therefore, when battery temperature TB is low and high, each of discharge power upper limit Wout and charge power upper limit Win is preferably lowered. ECU 200 sets charge power upper limit Win and discharge power upper limit Wout, for example, by using a map or the like, in accordance with battery temperature TB and current SOC.

Figure 2:
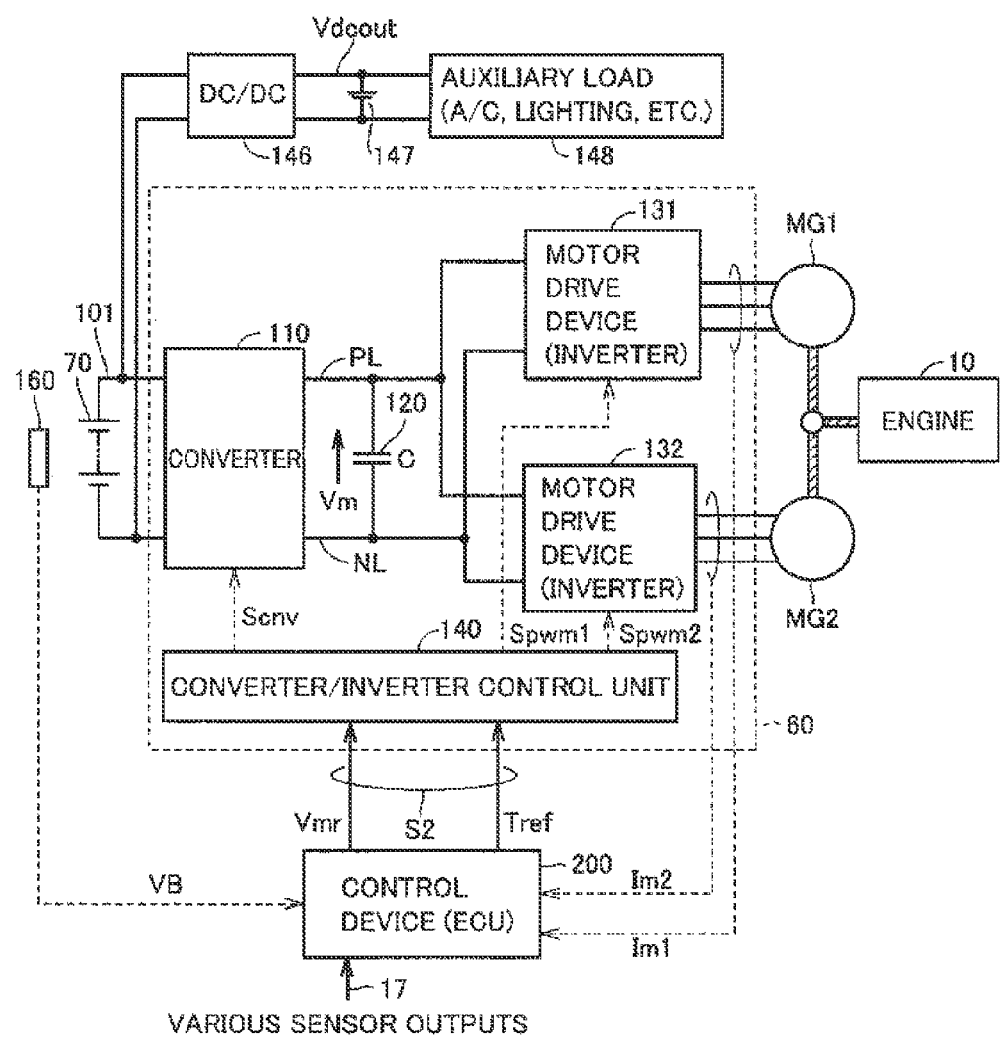
FIG. 2 is a block diagram showing a structure of a power supply device including PCU 60 of FIG. 1 and its neighborhood.

FIG. 2 is a block diagram showing a structure of a power supply device including PCU 60 of FIG. 1 and its neighborhood.

The power supply device of a vehicle shown in FIG. 2 includes battery 70 in which a plurality of battery cells are connected in series, voltage sensor 160 detecting battery voltage VB from battery 70, PCU 60 controlling drive of motor generators MG1 and MG2, and a portion of ECU 200 that controls PCU 60 (hereinafter referred to as a "control device 200"). The power supply device of a vehicle further includes a DC-DC converter 146, an auxiliary battery 147, and an auxiliary load 148 including an air-conditioner, lighting and the like. DC-DC converter 146 steps down the voltage of battery 70 to generate an auxiliary machinery voltage Vdcout, and supplies auxiliary machinery voltage Vdcout to auxiliary battery 147 and auxiliary load 148.

PCU 60 includes a converter 110, a smoothing capacitor 120, motor drive devices 131, 132 corresponding to motor generators MG1, MG2, respectively, and converter/inverter control unit 140. In this embodiment, since drive of motor generators MG1, MG2 which are AC motors is controlled, motor drive devices 131, 132 are implemented by inverters. Hereinafter, motor drive devices 131, 132 will be called inverters 131, 132.

Control device 200 determines request torque of motor generators MG1, MG2 in consideration of output distribution relative to engine 10 based on various sensor outputs 17. Furthermore, control device 200 calculates an optimum motor operating voltage in accordance with the operating states of motor generators MG1, MG2.

Control device 200 further generates a voltage command value Vmr of a motor operating voltage Vm and a torque command value Tref in motor generators MG1, MG2 based on the request torque and the optimum motor operating voltage as well as battery voltage VB received from voltage sensor 160. Voltage command value Vmr and torque command value Tref are supplied to converter/inverter control unit 140.

Converter/inverter control unit 140 generates a converter control signal Scnv for controlling the operation of converter 110 in accordance with voltage command value Vmr received from control device 200. Converter/inverter control unit 140 also generates inverter control signals Spwm1, Spwm2 for controlling the operation of each of inverters 131, 132 in accordance with torque command value Tref received from control device 200.

Figure 3:
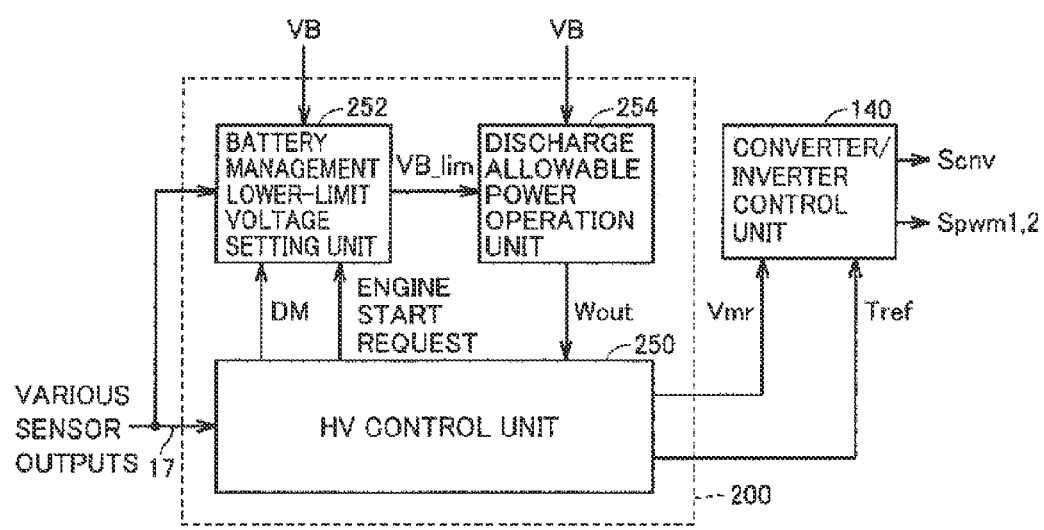
FIG. 3 is a block diagram showing a control structure in a control device 200 of FIG. 2.

FIG. 3 is a block diagram showing a control structure in control device 200 of FIG. 2. Although the control block shown in FIG. 3 is representatively achieved by control device 200 executing a program previously stored, part or all of the structure may be embodied as dedicated hardware.

Referring to FIG. 3, control device 200 includes an HV control unit 250, battery management lower-limit voltage setting unit 252, and discharge allowable power operation unit 254.

HV control unit 250 sets a running mode DM of vehicle 1 which is a hybrid vehicle, and outputs set running mode DM to battery management lower-limit voltage setting unit 252.

Specifically, HV control unit 250 switches between a mode of running only with the output of motor generator MG2 (hereinafter also referred to as an "EV running mode") and a mode of running with the outputs of engine 10 and motor generator MG2 (hereinafter also referred to as an "HV running mode") in accordance with the accelerator press-down degree or wheel speed included in various sensor outputs 17.

For example, when the load is light at the time of start, during running at a low speed, while running down a gentle slope, and the like, the EV running mode of running only with the output of motor generator MG2 without using the output of engine 10 in order to avoid a range where engine efficiency is low is set. That is, in a range where the accelerator press-down degree is small, vehicle 1 runs only with the output of motor generator MG2. In this case, operation of engine 10 is stopped except for the case where an engine start request condition is met.

It is noted that the EV running mode may be set in accordance with a driver's operation of an EV running selection switch (not shown).

On the other hand, during normal running where the accelerator press-down degree is larger than a predetermined value a %, engine 10 is started, so that the HV running mode is set. Accordingly, the output from engine 10 is split by power split device 40 into driving force for drive wheel 80 and driving force for power generation in motor generator MG1. Power generated by motor generator MG2 is used for driving motor generator MG2. Therefore, during normal running, drive wheel 80 is driven by the output from engine 10 and the output from motor generator MG2. At this time, control device 200 controls the motive power split ratio by power split device 40 of FIG. 1 such that the overall efficiency is maximized.

Furthermore, at the time of fast acceleration, electric power supplied from battery 70 is further used for driving motor generator MG2, and driving force for drive wheel 80 is further increased.

At the time of regenerative braking, motor generator MG2 is rotationally driven by drive wheel 80 to generate electric power. Electric power recovered by regenerative power generation of motor generator MG2 is converted into a DC voltage by PCU 60, and is used for charging of battery 70. Furthermore, when the vehicle stops, engine 10 is stopped automatically.

In this manner, in vehicle 1, operation of engine 10 and motor generator MG2 is controlled in accordance with a combination of the output from engine 10 and the output from motor generator MG2 originating from electrical energy, that is, the vehicle condition. Vehicle operation with improved fuel efficiency is thereby accomplished.

At this time, in the range where the accelerator press-down degree is small, start control of engine 10 is carried out when the engine start request condition where starting of engine 10 is required is met. The engine start request condition includes a case where a driving force request for fast acceleration or the like is given by the driver. As an example, a case where the accelerator press-down degree has exceeded the predetermined value a %, is included. Furthermore, a case where a request independent of the driving force request, such as that when the battery output is lowered to require charging of battery 70 or during warm-up of engine 10, is given may be included.

When the engine start request condition is met, HV control unit 250 drives, as engine start control, motor generator MG1 as an electric motor upon receipt of supply of electric power from battery 70, thereby cranking and starting engine 10. Furthermore, HV control unit 250 generates an engine start request signal at an H (logic high) level for output to battery management lower-limit voltage setting unit 252.

Specifically, as will be described later with reference to FIG. 4, battery management lower-limit voltage setting unit 252 usually sets management lower-limit voltage VB_lim at a predetermined voltage (VBL+Vmg0). This predetermined voltage (VBL+Vmg0) is a voltage obtained by adding an initial value Vmg0 of a voltage margin to battery lower-limit voltage VBL previously set based on the charging and discharging characteristics of battery 70 and the like so as to avoid the likelihood that SOC of battery 70 deviates from a proper range to lead to overdischarge. When the drive force request is changed abruptly, the delay in SOC calculation and the like will be a problem. Therefore, aside from overdischarge management by means of SOC, management lower limit voltage VB_lim of battery voltage VB is established.

When a predetermined condition is met, battery management lower-limit voltage setting unit 252 sets management lower-limit voltage VB_lim as relaxed relative to the predetermined voltage (VBL+Vmg0). Accordingly, a driver's driving request can be fulfilled in increasing cases.

Upon receipt of management lower-limit voltage VB_lim from battery management lower-limit voltage setting unit 252 and battery voltage VB from voltage sensor 160, discharge allowable power operation unit 254 derives discharge power upper limit Wout such that battery voltage VB does not fall below management lower-limit voltage VB_lim.

Specifically, as will be described later with reference to FIG. 8, discharge allowable power operation unit 254 compares the magnitude correlation between battery voltage VB received from voltage sensor 160 and management lower-limit voltage VB_lim, and when battery voltage VB is higher than management lower-limit voltage VB_lim, derives discharge power upper limit Wout based on battery voltage VB. At this time, discharge allowable power operation unit 254 derives discharge power upper limit Wout based on SOC calculated from battery voltage VB using a well-known technique. It is noted that discharge power upper limit Wout at this time is a limit value of discharge power at each time defined by a chemical reaction limit of battery 70.

Actually, discharge allowable power operation unit 254 previously stores a discharge allowable power map in which battery voltage VB is defined as a parameter, and derives discharge power upper limit Wout at each time based on battery voltage VB.

On the other hand, when battery voltage VB becomes less than or equal to management lower-limit voltage VB_lim, discharge allowable power operation unit 254 fixes discharge power upper limit Wout at a predetermined minimum allowable power (lower limit power) set previously. In this manner, power restrictions on battery 70 are imposed such that battery voltage VB does not fall below management lower-limit voltage VB_lim.

HV control unit 250 sets running mode DM of vehicle 1 in accordance with various sensor outputs 17 as described above, and determines request torque of motor generators MG1, MG2 in consideration of output distribution relative to the engine or the like based on various sensor outputs 17. Furthermore, HV control unit 250 calculates the optimum motor operating voltage in accordance with the determined request torque and the motor speed.

Then, HV control unit 250 generates voltage command value Vmr of motor operating voltage Vm and torque command value Tref in motor generators MG1, MG2 based on the request torque and the optimum motor operating voltage as well as discharge power upper limit Wout.

Specifically, HV control unit 250 calculates motor consuming power equivalent to the request torque, and determines whether or not the calculated motor consuming power exceeds discharge power upper limit Wout. At this time, when the calculated motor consuming power is less than or equal to discharge power upper limit Wout, the motor consuming power will not exceed discharge power upper limit Wout even when motor generators MG1, MG2 consume electric power in accordance with the request torque. Thus, HV control unit 250 sets torque command value Tref to be equivalent to the request torque. HV control unit 250 also sets voltage command value Vmr to be equivalent to the optimum motor operating voltage.

On the other hand, in the case where the motor consuming power exceeds discharge power upper limit Wout, the motor consuming power will exceed discharge power upper limit Wout when motor generators MG1, MG2 consume electric power in accordance with the request torque. Therefore, in this case, the motor consuming power is restricted so as not to exceed discharge power upper limit Wout.

Specifically, the motor consuming power at the limit where the motor consuming power=discharge power upper limit Wout holds is calculated, and torque command value Tref is calculated in correspondence to the calculated motor consuming power. That is, torque command value Tref is restricted so as to be smaller than initial request torque Trq. Similarly, voltage command value Vmr is restricted so as to be smaller than the initial optimum motor operating voltage in accordance with this restricted request torque Trq.

Torque command value Tref and voltage command value Vmr thus generated are supplied to converter/inverter control unit 140. Converter/inverter control unit 140 determines the boosting ratio at converter 110 (FIG. 2) based on voltage command value Vmr, and generates converter control signal Scnv such that this boosting ratio is achieved.

Converter/inverter control unit 140 further generates inverter control signals Spwm1, Spwm2 in accordance with output values from various sensors such that a motor current that will produce torque in accordance with torque command value Tref flows in each phase of motor generators MG1, MG2. For example, inverter control signals Spwm1, Spwm2 are PWM signal waves generated in accordance with a common control scheme. The output values from various sensors include, for example, output values from a position sensor and a speed sensor of motor generators MG1, MG2, an output value from a current sensor for detecting an each-phase current, and an output value from a voltage sensor for detecting motor operating voltage Vm.

Figure 4:
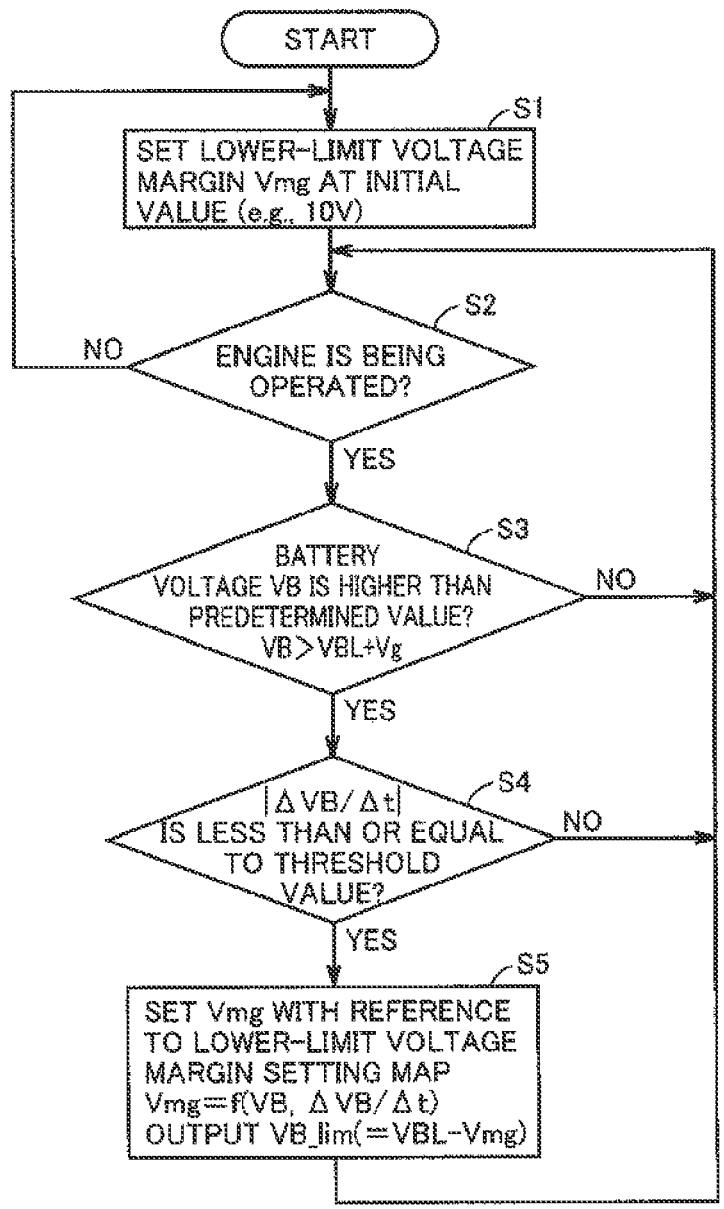
FIG. 4 is a flowchart for illustrating control executed by a battery management lower-limit voltage setting unit 252 of FIG. 3.

FIG. 4 is a flowchart for illustrating control executed by battery management lower-limit voltage setting unit 252 of FIG. 3. Referring to FIG. 4, first, in step S1, an initial value (e.g., initial value Vmg0=10V) is set as lower-limit voltage margin Vmg.

Figure 5:
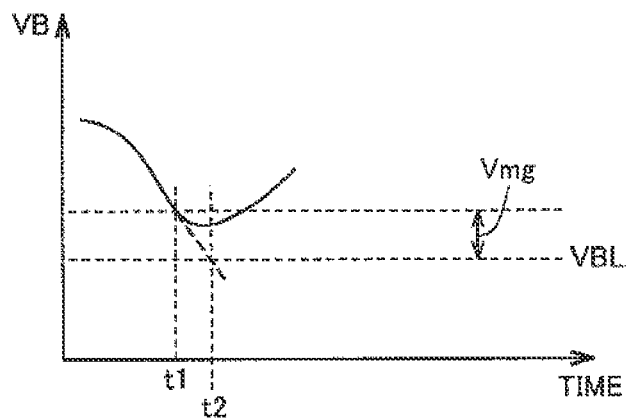
FIG. 5 is a diagram for illustrating relation between a lower limit voltage VBL and a lower-limit voltage margin Vmg.

FIG. 5 is a diagram for illustrating relation between lower limit voltage VBL and lower-limit voltage margin Vmg. In FIG. 5, lower limit voltage VBL is a lower limit voltage to be kept which is determined by the used temperature and the battery performance. When battery voltage VB falls below lower limit voltage VBL, an adverse effect is exerted on the battery life. Thus, control is effected such that battery voltage VB does not fall below lower limit voltage VBL.

Then, in terms of battery protection, constant margin voltage Vmg is set for lower limit voltage VBL by control and the voltage is fed back to restrict the battery output such that battery voltage VB does not fall below lower limit voltage VBL in any running state or surrounding environment. Therefore, when battery voltage VB falls below VBL+Vmg at time t1, battery voltage VB is recovered by restriction on the battery output. This can avoid the situation where battery voltage VB indicated by the broken line at time t2 falls below lower limit voltage VBL.

However, initial value Vmg0 of voltage margin is set with a margin in consideration of the case where voltage drop occurs due to an abrupt power request (e.g., the case where, when an acceleration request occurs and electric power is consumed by MG2, further electric power is consumed by cranking by MG1 at the time of engine start). Therefore, in the situation where an abrupt power request does not occur, the battery capacity cannot be used up since the battery power is restricted leaving a considerable margin with respect to lower limit voltage VBL to be kept. The case where a driver's acceleration request or the like cannot be fulfilled also arises since the battery capacity cannot be used up.

Particularly, there are some cases where the output from the engine is made as low as possible during warm-up of a catalyst for countermeasures against exhaust emission control and the vehicle runs with torque of motor generator MG2 when possible such that a heavy load will not be imposed on the engine until warm-up of the catalyst is completed since the engine is started. If the battery output is restricted in such a case, the case where the driver's acceleration request or the like cannot be fulfilled may occur.

Therefore, in the vehicle of the present embodiment, it is determined in step S2 whether or not the engine is being operated. If the engine is already operating, cranking by motor generator MG1 at the time of engine start does not take place, and therefore, an abrupt power request will not occur. In such a case, more responsive running exerting the battery performance is possible without imposing unnecessary restrictions on the battery output.

In step S2, when the engine is not being operated, cranking by motor generator MG1 may occur in order to start the engine. Thus, voltage margin Vmg needs a margin. Therefore, the process is returned to step S1, and lower-limit voltage margin Vmg is set at an initial value.

On the other hand, if the engine is being operated in step S2, the process is advanced to step S3. In step S3, it is determined whether or not battery voltage VB is higher than a predetermined value. The predetermined value is lower limit voltage VBL+Vg, for example, and voltage Vg can be set at 3V, for example. When battery voltage VB has already dropped to the vicinity of lower limit voltage VBL, battery voltage VB may reach lower limit voltage VBL shortly after loosening restriction on the battery output. Therefore, it is not appropriate to decrease lower-limit voltage margin Vmg.

When VB>VBL+Vg does not hold in step S3, the process is returned to step S2, and when VB>VBL+Vg holds in step S3, the process is advanced to step S4.

In step S4, it is determined whether or not the magnitude of ΔVB/Δt is less than or equal to a threshold value. This is because if the degree of reduction in battery voltage VB is slow, lower-limit voltage margin Vmg may be made small, but if the degree of reduction in battery voltage VB is abrupt, battery voltage VB may reach lower limit voltage VBL because of a time delay until the battery output is restricted or a response delay of the battery when lower-limit voltage margin Vmg is made small.

If the magnitude of ΔVB/Δt is not less than or equal to the threshold value in step S4, the process is returned to step S2, and when the magnitude of ΔVB/Δt is less than or equal to the threshold value in step S4, the process is advanced to step S5.

In step S5, lower-limit voltage margin Vmg is set with reference to the lower-limit voltage margin setting map. The equation Vmg=f (VB, ΔVB/Δt) indicates that lower-limit voltage margin Vmg is determined by battery voltage VB and ΔVB/Δt in the map.

Then, lower limit voltage VB_lim used for control is output from battery management lower-limit voltage setting unit 252 of FIG. 3 to discharge allowable power operation unit 254. When the processing in step S5 is terminated, the processing in and subsequent to step S2 is executed again.

Figure 6:
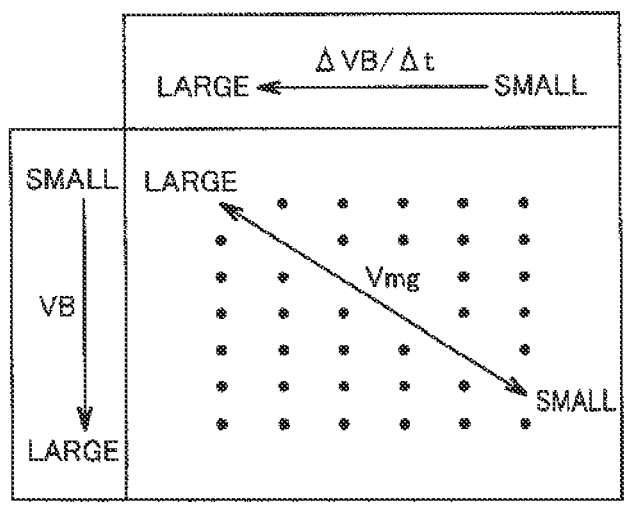
FIG. 6 is a diagram showing an exemplary lower-limit voltage margin setting map used in step S5 of FIG. 4.

FIG. 6 is a diagram showing an exemplary lower-limit voltage margin setting map used in step S5 of FIG. 4.

Figure 7:
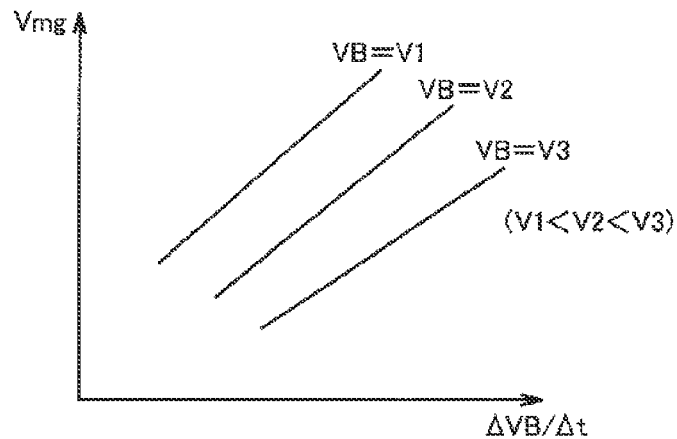
FIG. 7 is a diagram showing an exemplary lower-limit voltage margin setting map used in step S5 of FIG. 4 by a different representation from FIG. 6.

FIG. 7 is a diagram showing an exemplary lower-limit voltage margin setting map used in step S5 of FIG. 4 by a different representation from FIG. 6.

As shown in FIGS. 6 and 7, when battery voltage VB and magnitude ΔVB/Δt of change in battery voltage are input to the lower-limit voltage margin setting map, corresponding lower-limit voltage margin Vmg is determined. As shown in FIG. 7, lower-limit voltage margin Vmg increases as the magnitude ΔVB/Δt of change in battery voltage increases. This is because a wide margin is required at the time of an abrupt change in order to keep lower limit voltage VBL. On the other hand, lower-limit voltage margin Vmg increases as battery voltage VB decreases. This is because, when battery voltage VB is lower, it is closer to lower limit voltage VBL, and in order to reliably keep lower limit voltage VBL, it is desirable that lower-limit voltage margin Vmg be wider.

As described above, discharge allowable power operation unit 254 of FIG. 3 determines whether or not to restrict the battery output based on voltage VB_lim set by battery management lower-limit voltage setting unit 252 of FIG. 3 based on the flowchart of FIG. 4.

Figure 8:
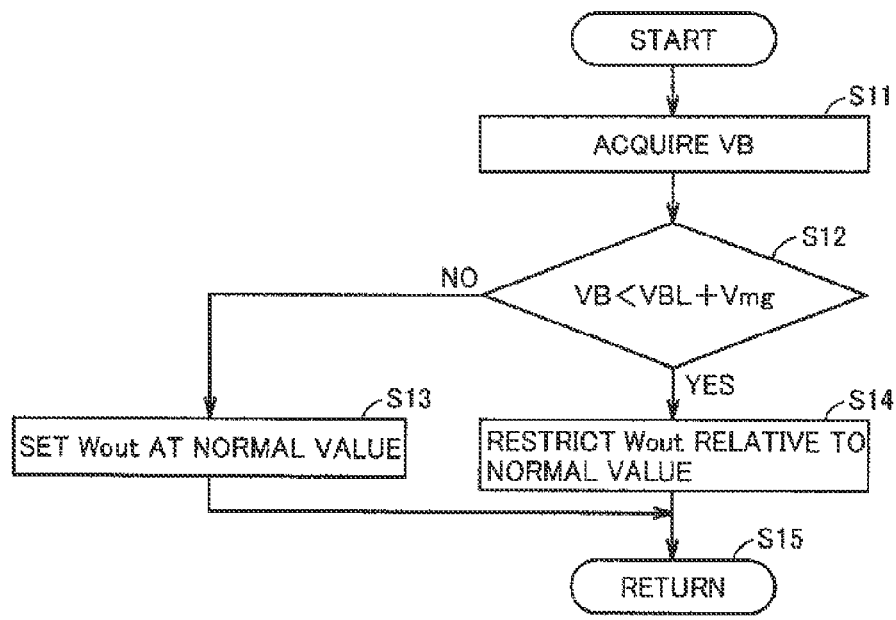
FIG. 8 is a flowchart for illustrating control executed by a discharge allowable power operation unit 254 of FIG. 3.

FIG. 8 is a flowchart for illustrating control executed by discharge allowable power operation unit 254 of FIG. 3. Processing of this flowchart is invoked from the predetermined main routine and executed after each lapse of a certain time period or a predetermined condition is met.

Referring to FIG. 8, when the processing is first started, discharge allowable power operation unit 254 acquires battery voltage VB in step S11. In step S12, it is determined whether or not battery voltage VB is lower than a threshold value. The threshold value here is set at a value obtained by adding lower-limit voltage margin Vmg determined by the flowchart of FIG. 4 to battery lower-limit voltage VBL to be kept.

In step S12, when VB<VBL+Vmg does not hold, the process is advanced to step S13, and discharge power upper limit Wout is set at a normal value. This normal value is a battery output upper limit determined based on SOC, battery temperature, and the like.

On the other hand, in step S12, when VB<VBL+Vmg holds, the process is advanced to S14, and discharge power upper limit Wout is restricted to a value lower than the normal value. By restricting discharge power upper limit Wout to a value lower than the normal value, battery voltage VB can be avoided from falling below lower limit voltage VBL.

When discharge power upper limit Wout is determined in step S13 or step S14, the process is advanced to step S15, and control is shifted to the main routine.

Figure 9:
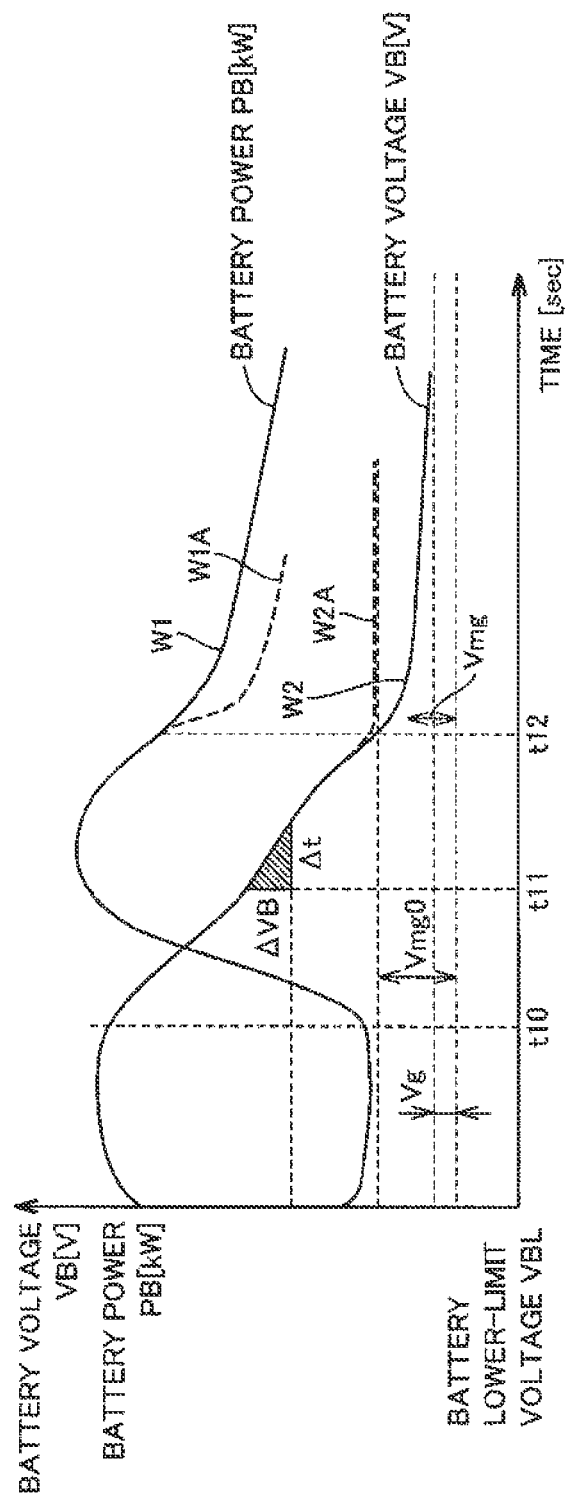
FIG. 9 is a diagram showing exemplary changes in battery voltage and battery power when control is performed by a control method of a present embodiment.

FIG. 9 is a diagram showing exemplary changes in battery voltage and battery power when control is performed by the control method of the present embodiment.

Referring to FIG. 9, lower-limit voltage margin Vmg is set at Vmg0 as an initial value. For example, initial value Vmg0 is 10V.

As shown at time t10, when battery power PB (kW) increases, battery voltage VB starts dropping due to the voltage drop caused by the internal resistance of the battery or reduction in SOC. As shown at time t11, degree ΔVB/Δt of change in voltage VB is monitored in the meantime.

If lower-limit voltage margin Vmg remains at initial value Vmg0, discharge power upper limit Wout is restricted at time t12 when battery voltage VB reaches VBL+Vmg0. In this case, battery power PB is restricted as indicated by a line W1A, and battery voltage VB stops dropping around VBL+Vmg0 as indicated by a line W2A.

On the other hand, when lower-limit voltage margin Vmg is changed from initial value Vmg0 with reference to the map, the battery output is not restricted since battery voltage VB is still higher than VBL+Vmg at time t12, and battery power PB transitions as indicated by a line W1. Then, battery voltage VB further drops within a range where it does not fall below battery lower-limit voltage VBL as indicated by a line W2.

Therefore, electric power is output from the battery as requested by the user as long as the change in battery voltage VB is not abrupt even after time t12 and the voltage is higher than guard voltage VBL+Vg. The vehicle can thereby be operated in accordance with the user's request.

[Variation]

It is noted that although vehicle 1 having drive wheel 80 as a front wheel has been shown by way of example in FIG. 1, the vehicle is not particularly limited to such a drive system. For example, vehicle 1 may have a rear wheel as a drive wheel. Alternatively, vehicle 1 may be a vehicle not including motor generator MG2 in FIG. 1. Alternatively, vehicle 1 may be a vehicle in which motor generator MG2 in FIG. 1 is coupled to a drive shaft for driving a rear wheel instead of drive shaft 16 of a front wheel. In addition, a speed change mechanism may be provided between drive shaft 16 and reduction gear 58 or between drive shaft 16 and motor generator MG2.

Figure 10:
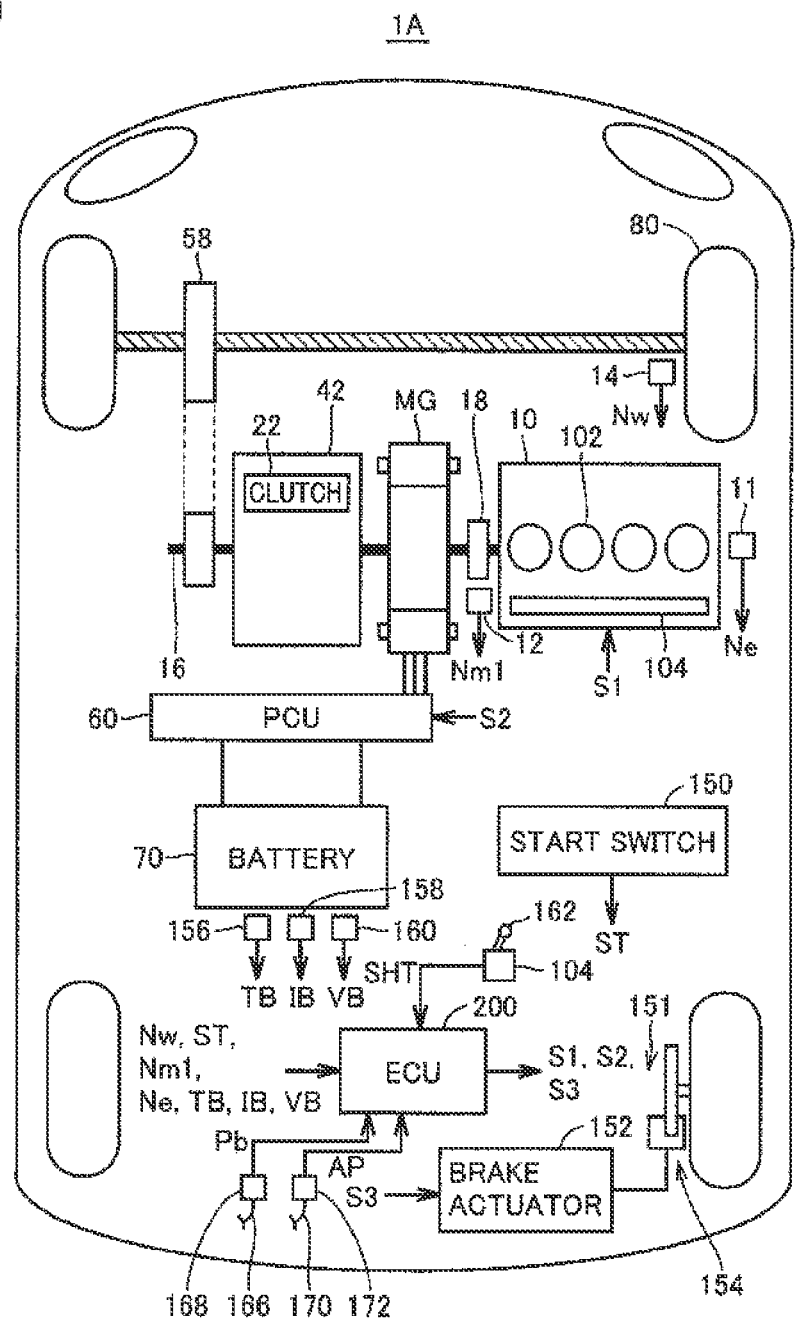
FIG. 10 is a diagram showing an exemplary structure of a variation of a vehicle.

FIG. 10 is a diagram showing an exemplary structure of a vehicle of a variation. Referring to FIG. 10, as compared with the structure of vehicle 1 of FIG. 1, a vehicle 1A as a variation differs in that motor generator MG2 is not provided, the rotation shaft of motor generator MG1 is directly coupled to the output shaft of engine 10, a power transmission device 42 having a clutch 22 is provided instead of power split device 40, and a clutch 18 is further provided between engine 10 and motor generator MG1. Clutch 22 changes motor generator MG1 and drive wheel 80 between a power transmission state and a power cut-off state. Power transmission device 42 is a speed change mechanism, for example.

In the vehicle having such a structure, the case where the battery output is restricted even when unnecessary is also reduced by setting lower-limit voltage margin Vmg by similar control to FIG. 4. The vehicle is thereby more likely to be capable of running in accordance with a user's request.

At last, the present embodiment will be summarized referring again to the drawings. Vehicle 1 or 1A shown in FIG. 1 or 10 includes engine 10, motor generator MG1 or MG for starting engine 10, PCU 60 for operating motor generator MG1 or MG, battery 70 for supplying electric power to PCU 60, and control device 200 for controlling PCU 60 such that the voltage of battery 70 does not fall below the lower limit. When a change condition including a condition that engine 10 is being operated (step S2 in FIG. 4) is met, control device 200 sets the lower limit at a value lower than while engine 10 is at a stop.

Preferably, the change condition further includes a condition that a magnitude of voltage change of battery 70 is less than or equal to a first threshold value (step S4 in FIG. 4) in addition to the condition that engine 10 is being operated.

More preferably, the change condition further includes a condition that a voltage of battery 70 is higher than a second threshold value (step S3 in FIG. 4) in addition to the conditions that engine 10 is being operated and the magnitude of voltage change of battery 70 is less than or equal to the first threshold value.

Preferably, as shown in FIG. 1, vehicle 1 further includes motor generator MG2 operated by PCU 60 and generating promotion torque of the vehicle.

More preferably, when engine 10 is being operated, motor generator MG1 receives motive power from engine 10 to generate electric power according to necessity.

Further preferably, vehicle 1 further includes power split device 40 connected to each of the respective rotation shafts of motor generator MG1, motor generator MG2 and engine 10.

Preferably, motor generator MG shown in FIG. 10 generates promotion torque of the vehicle, and according to necessity, generates torque for starting engine 10.

More preferably, vehicle 1A further includes clutch 18 provided between the rotation shaft of engine 10 and the rotation shaft of motor generator MG, and power transmission device 42 provided between motor generator MG and the drive shaft.

It is noted that although the present embodiment has illustrated the example of hybrid vehicle, the present invention is not limited to a hybrid vehicle, but can also be applied to any vehicle that has mounted thereon a motor for starting an engine and the engine.

It should be understood that the embodiment disclosed herein is illustrative and non-restrictive in every respect. The scope of the present invention is defined by the scope of the claims, rather than the description above, and is intended to include any modifications within the scope and meaning equivalent to the terms of the claims.

REFERENCE SIGNS LIST 1, 1A vehicle; 10 engine; 11 engine rotation speed sensor; 12, 13 resolver; 14 wheel speed sensor; 16 drive shaft; 18, 22 clutch; 40 power split device; 42 power transmission device; 50 sun gear; 52 pinion gear; 54 carrier; 56 ring gear; 58 reduction gear; 70 battery; 80 drive wheel; 102 cylinder; 104 fuel injector; 110 converter; 120 smoothing capacitor; 131, 132 motor drive unit; 131, 132 inverter; 140 inverter control unit; 150 start switch; 151 braking device; 152 brake actuator; 154 disc brake; 156 battery temperature sensor; 158 current sensor; 160 voltage sensor; 166 brake pedal; 168 brake pedal pressing force sensor; 170 accelerator pedal; 172 pedal stroke sensor; 200 control device; 250 control unit; 252 battery management lower-limit voltage setting unit; 254 discharge allowable power operation unit; MG1, MG2 motor generator.

The invention claimed is:

1. A vehicle comprising:
an internal combustion engine;
a first rotating electric machine starting said internal combustion engine;
a power control unit for operating said first rotating electric machine;
a power storage device for supplying electric power to said power control unit; and
a control device controlling said power control unit such that a voltage of said power storage device does not fall below a lower limit, when a change condition including a condition that said internal combustion engine is being operated is met, said control device setting said lower limit at a value lower than while said internal combustion engine is at a stop.

2. The vehicle according to claim 1, wherein said change condition further includes a condition that a magnitude of voltage change of said power storage device is less than or equal to a first threshold value in addition to the condition that said internal combustion engine is being operated.

3. The vehicle according to claim 2, wherein said change condition further includes a condition that the voltage of said power storage device is higher than a second threshold value in addition to the conditions that said internal combustion engine is being operated and the magnitude of voltage change of said power storage device is less than or equal to said first threshold value.

4. The vehicle according to claim 1, further comprising a second rotating electric machine operated by said power control unit and generating promotion torque of the vehicle.

5. The vehicle according to claim 4, wherein when said internal combustion engine is being operated, said first rotating electric machine receives motive power from said internal combustion engine to generate electric power according to necessity.

6. The vehicle according to claim 5, further comprising a power split device connected to each of rotation shafts of said first rotating electric machine, said second rotating electric machine and said internal combustion engine.

7. The vehicle according to claim 1, wherein said first rotating electric machine generates promotion torque of the vehicle and according to necessity, generates torque for starting said internal combustion engine.

8. The vehicle according to claim 7, further comprising:
a clutch provided between a rotation shaft of said internal combustion engine and a rotation shaft of said first rotating electric machine; and
a speed change mechanism provided between said first rotating electric machine and a drive shaft.

9. A method for controlling a vehicle including an internal combustion engine, a first rotating electric machine starting said internal combustion engine, a power control unit for operating said first rotating electric machine, and a power storage device for supplying electric power to said power control unit, comprising the steps of:
setting a lower limit at an initial value;
when a change condition including a condition that said internal combustion engine is being operated is met, setting said lower limit at a value lower than while said internal combustion engine is at a stop; and
controlling said power control unit such that a voltage of said power storage device does not fall below the lower limit.

* * * * *